2,762,287

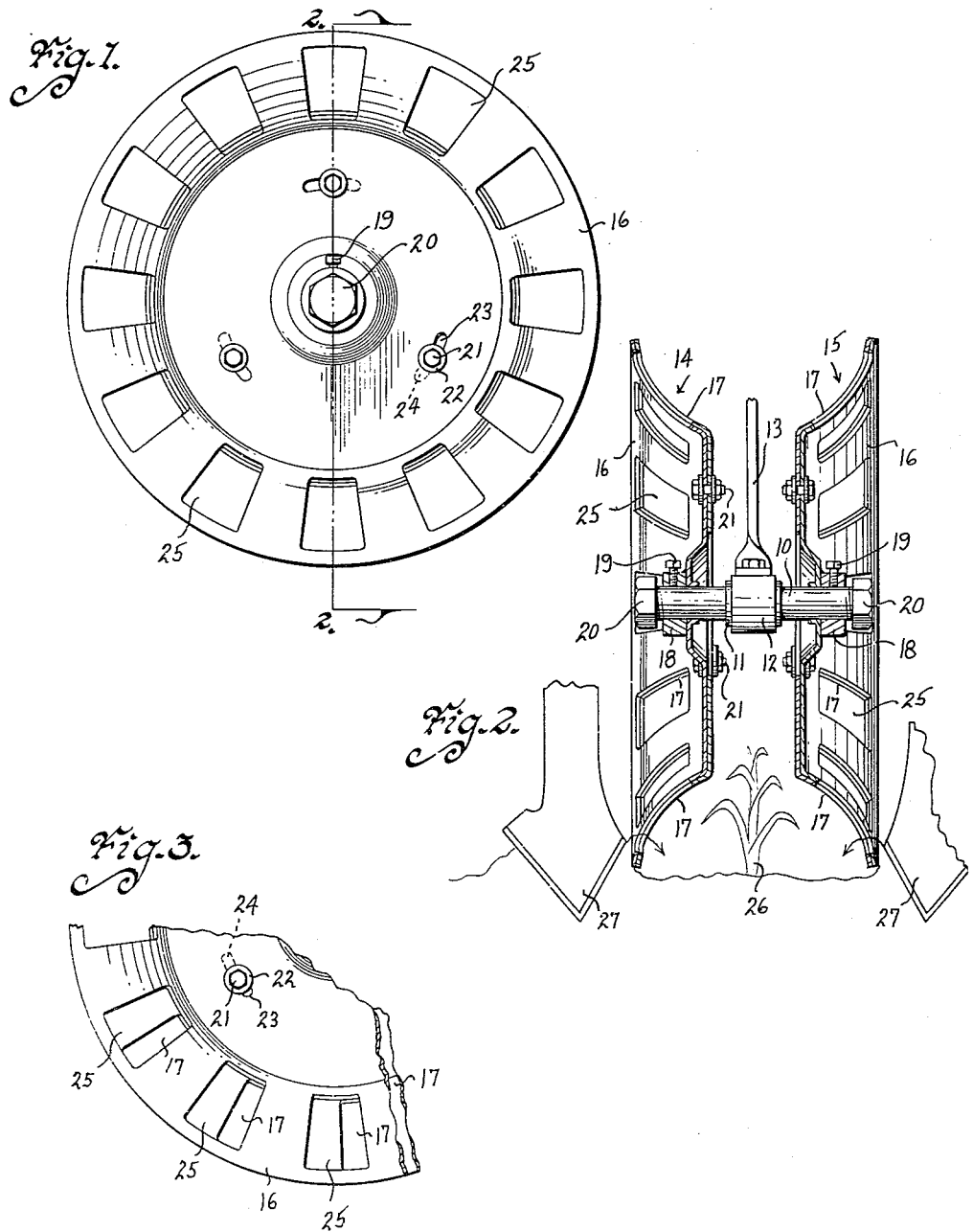

PLANT SHIELD FOR CULTIVATORS

Benjamin F. Greiman, Garner, Iowa

Application July 13, 1951, Serial No. 236,639

4 Claims. (Cl. 97—188)

My invention relates to improvements in plant shields for cultivators.

When cultivating rows of plants and young plants especially, it is desirable to prevent clods of dirt from falling upon and injuring the plants and at the same time a certain amount of fine soil should generally be deposited around the base of the plants to replenish that which may have become washed away. To some extent this has been accomplished by the use of shields mounted on a tractor or the like with the shields having predetermined sized openings designed to permit the passage therethrough of fine dirt and yet obstruct the passage of larger clods.

I have now invented, however, an improvement for plant shields that has as its principal object the adjustability of the openings in the shield so that the size and amount of dirt particles passing through the shield to the plants can be selectively controlled.

More specifically my invention embodies the use of a pair of circular shields oppositely disposed on a horizontal supporting shaft. Each shield of the pair comprises two shield units, one nested within the other and the two shields comprising each of the pair have registering openings. One shield of each of the pair is capable of being separately rotated so that the size of the registering openings can be decreased to any degree less than the whole or closed completely.

A further object of my invention is to provide a cultivator shield of the above class wherein the lateral spaced relationship of the shields can be varied.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side elevational view of my plant shield showing the openings registering with the openings of the inner nested shield, Fig. 2 is a cross-sectional view of this invention taken on the line 2—2 of Fig. 1, and Fig. 3 is a fragmentary side view of my shield showing the openings partially closed by the inner shield.

Referring to the drawings, I have used the numeral 10 to designate a horizontal shaft rotatably mounted in a bearing member 11 as shown in Fig. 2. The member 11 is embraced by a collar 12 to which is secured an upwardly extending rod 13 that is designed to be secured by any suitable means to a tractor or the like, which is not shown. A pair of circular cultivator shields indicated generally at 14 and 15 in Fig. 2 are oppositely disposed on the respective ends of the shaft 10 and it is in these shields wherein my invention lies which I will now describe.

Each of the pairs 14 and 15 of the shields comprises two shield units or members, an outer shield 16 and an inner shield 17 which are constructed so that they nest snugly together to form a single unit as shown in Fig. 2. A collar or bearing member 18 is secured to each of the outer shield units 16 which provides a means for mounting the shields on the shaft 10. The set screw 19 in each collar 18 prevents the shields from rotating separately of the shaft and permits a lateral adjustment of each shield thereon. A cap or nut 20 threaded to each end of the shaft 10 limits the outward adjustment of the shield but may of course be removed if necessary when making repair or replacement of parts. Each inner shield member 17 is detachably secured to its corresponding outer shield 16 by means of plurality of bolts 21 and washers 22 as shown in Fig. 1. For this purpose the outer shield members 16 have the slots 23 curved to correspond to the perimeter of the shields and the inner shields 17 have the slots 24. It is pointed out that in making the slots 23 and 24 it is necessary to provide them in only one of the shields 16 and 17 but I show them in both for the reason that for economy in manufacture both members 16 and 17 are made from the same die.

A plurality of radially extending openings 25 are provided in each of the shield members 16 and 17 as shown in Fig. 1. The openings 25 in each respective inner and outer shield unit are of the same size and similarly spaced and located so that they will register with each other as shown in Fig. 2. However, by loosening the nuts 21, the inner shield units 17 may be slightly rotated for a distance limited by the length of the slots 23 and 24 so that the size of the openings 25 will be progressively lessened (Fig. 3) as the solid portions of the shield intermediate the openings on the inner shield units extends across the corresponding openings on the outer shield. The length of the slots 23 should be sufficient to permit a complete closure of the openings in the outer shield units, if desired.

The shields 14 and 15 are designed to be used in a customary manner whereby they straddle the plants 26 to protect them from dirt thrown by the plow blades 27 as shown in Fig. 2. By using my invention, it is now possible to alter the size of the openings in the shields to effectively regulate the size and quantity of dirt particles that will pass therethrough to the plants.

Preferably I have illustrated my invention on a shield of the circular type and of a concave-convex construction, but the principle thereof can be applied to shields of different designs and whether rotatable or fixed. Also it is pointed out that my use of the double shield unit 16 and 17 to constitute one of the pairs 14 and 15 is but one embodiment of a means to illustrate my invention. A circular band or plate might be substituted for my shield unit 17 and have openings to register with those of the shield member 16. Similarly individual cover members might be pivotally secured at one end to the shield 16 so they could be moved to progressively lessen the area of the openings in the shield 16.

Other changes may be made in the construction and arrangement of my plant shield for cultivators without departing from the real spirit and purpose of my invention, and it is my intention to cover by my claims. any modified forms of structure or use of mechanical equivalents which may be reasonably included within their scope.

I claim:

1. In a device of the class described, a rotatable horizontal shaft adapted to be mounted at times on a tractor or the like, a first circular shield member having a concave peripheral portion with a plurality of circumferentially spaced apertures provided adjacent its periphery and mounted on said shaft, locking means on said shield to hold it against rotation independently of said shaft, said shield laterally adjustable on said shaft by said locking means, stop means on said shaft for limiting the lateral adjustment thereon of said shield in two directions respectively, a second circular shield having a concave peripheral portion with a plurality of circumferentially spaced apertures provided adjacent to its periphery, mounted around said shaft and nested within said first shield with means whereby said second shield may rotate within said first shield, the apertures in each shield member capable of registering at times by rotating said second shield into a position of symmetrical alignment within said first shield, and the rotation of said second apertured shield member adapted to progressively close the apertures in said first apertured shield member by varying the degree of symmetrical alignment of said second shield within said first shield, and a means for locking said first and second shields against independent rotation.

2. In a device of the class described, a rotatable horizontal shaft adapted to be mounted at times on a tractor or the like, a pair of cultivator shields disposed on said shaft, each of said shields consisting of a pair of discs with a plurality of circumferentially spaced apertures provided adjacent their peripheries, and nested together so that the respective apertures are capable of registering at times by rotating the inside disc in a position of symmetrical alignment within the outside disc, the rotation of said inside disc of each shield upon said corresponding outside disc allowing said apertures to be progressively closed; said shields having their peripheral portions concave and facing each other to form thereby a cup-like arrangement for embracing a plant to be cultivated, and means for locking each of said inside discs to its adjacent outside disc.

3. In a device of the class described, a rotatable horizontal shaft adapted to be mounted at times on a tractor or the like, a pair of cultivator shields disposed on said shaft and rotatable therewith, locking means on each of said shields to hold them against rotation independently of said shaft, each of said shields independently laterally adjustable on said shaft by said locking means, stop means on said shaft for limiting the lateral adjustment thereon of said shields in two direction respectively, each of said shields consisting of a pair of discs with a plurality of circumferentially spaced apertures provided adjacent their peripheries, and nested together so that the respective apertures are capable of registering at times by rotating the inside disc in a position of symmetrical alignment within the outside disc; the rotation of said inside disc of each shield upon said corresponding outside disc allowing said apertures to be progressively closed; said shields having their peripheral portions concave and facing each other to form thereby a cup-like arrangement for embracing a plant to be cultivated, and means for locking each of said inside discs to its adjacent outside disc.

4. In a device of the class described, a collar having its bore disposed horizontally, a shaft mounted in said collar, means on said collar for securing it at times to a tractor or the like, a pair of rotatable shield members mounted said shaft, locking means on said shields to hold them against rotation independently of said shaft, said shields being laterally adjustable on said shaft by said locking means, said collar serving as a stop means to limit the lateral movement of said shields on said shaft in one direction and stop means on said shaft to limit the lateral movement of said shields thereon in the other direction, said shield members each consisting of a pair of discs with a plurality of circumferentially spaced apertures provided adjacent their peripheries; said discs being nested together so that the respective apertures are capable of registering at times by rotating the inside disc in a position of symmetrical alignment within the outside disc, the rotation of said inside disc of each shield upon said corresponding outside disc allowing said apertures to be progressively closed; said shields having their peripheral portions concave and facing each other to form thereby a cup-like arrangement for embracing a plant to be cultivated, and means for locking each of said inside discs to its adjacent outside disc.

References Cited in the file of this patent

UNITED STATES PATENTS

| | | |
|---|---|---|
| 51,031 | Fernald | Nov. 21, 1865 |
| 125,732 | Gillespie | Apr. 16, 1872 |
| 463,933 | Armstrong | Nov. 24, 1891 |
| 824,961 | Teeter | July 3, 1906 |
| 1,349,419 | Garst | Aug. 10, 1920 |
| 1,419,687 | Otto | June 13, 1922 |
| 1,454,724 | Carey | May 8, 1923 |
| 2,433,199 | Carter | Dec. 23, 1947 |